United States Patent Office 2,783,281
Patented Feb. 26, 1957

2,783,281
ETHYL-CHLOROMETHYL-PROPARGYL-CARBINOL

Otto Isler, Basel, and Paul Zeller, Neuallschwil, Switzerland, assignors to Hoffmann-La Roche Inc., Nutley, N. J., a corporation of New Jersey No Drawing. Application June 7, 1954,
Serial No. 435,036

Claims priority, application Switzerland June 12, 1953

1 Claim. (Cl. 260—633)

The present invention provides a novel propargyl-carbinol, i. e. ethyl-chloromethyl-propargyl-carbinol. This compound is pharmacologically active. In particular, it possesses strong hypnotic properties while being of low toxicity. It is thus useful as a sedative.

The present invention further provides a process for the manufacture of the said ethyl-chloromethyl-propargyl-carbinol, which process comprises reacting a propargyl halide, preferably the bromide, by means of a zinc reaction with 1-chloro-butanone-(2) and hydrolytically decomposing the zinc compound formed.

1-chloro-butanone-(2) and propargyl halides are known starting materials. The condensation of the propargyl halide with the ketone is suitably conducted in the presence of an inert solvent, preferably ether or a mixture of ether and benzene. The zinc metal acting as condensation agent may advantageously be present in the form of zinc dust or zinc granules. It is recommended to effect the reaction at a temperature of about 40° C. A suitable mode of procedure consists of adding a mixture of the ketone with the propargyl halide to the zinc metal condensation agent, while taking care of excluding any moisture. Should the reaction not start forthwith, the zinc metal may be activated by heating the same with a minute amount of iodine. The organic zinc compound formed during the reaction is hydrolyzed, in the manner usual for such zinc reactions, e. g. by means of dilute acid, of water or of ammonium salt solutions. The propargyl-carbinol thus produced may be purified by distillation.

Example 11.2 parts by weight of propargyl bromide, 10 parts by weight of 1-chloro-butanone-(2) and 30 parts by weight of dry ether are added, while stirring, to 10 parts by weight of zinc dust in such a manner as to keep the solvent constantly boiling by the influence of the heat of reaction. After completion of the addition, the reaction mixture is stirred for further 10 minutes, then cooled down to 5° C. and hydrolyzed with 3 N sulfuric acid. The condensation product is taken up in ether, washed with water, dried with calcium chloride, the solvent is evaporated and the residue is fractionated. The main run consists of 7 parts by weight of ethyl-chloromethyl-propargyl-carbinol of boiling point 71–72° C./14 mm. and $n_D^{22} = 1.4735$.

We claim:
Ethyl-chloromethyl-propargyl-carbinol.

References Cited in the file of this patent
UNITED STATES PATENTS

| 1,841,768 | Straus et al. | Jan. 19, 1932 |
| 2,444,960 | Smith et al. | July 13, 1948 |
| 2,540,116 | Huber et al. | Feb. 6, 1951 |

OTHER REFERENCES

Henbest et al.: "Reformatskii Reactions with Propargyl Bromide," J. Chem. Soc., London (1949), pps. 2696–2700.

Berger: Medicinal Chemistry, vol. I (1951), pps. 129–130.

P'an et al.: "Effect of Halogenation—of Acetylenic Carbinols," J. Pharmacol. Exptl. Therap., vol. 109, p. 268 (1953).